(12) United States Patent
Tang

(10) Patent No.: US 11,363,668 B2
(45) Date of Patent: Jun. 14, 2022

(54) DISCONTINUOUS RECEPTION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 159 days.

(21) Appl. No.: 16/643,089

(22) PCT Filed: Sep. 7, 2017

(86) PCT No.: PCT/CN2017/100957
§ 371 (c)(1),
(2) Date: Feb. 28, 2020

(87) PCT Pub. No.: WO2019/047131
PCT Pub. Date: Mar. 14, 2019

(65) Prior Publication Data
US 2020/0205218 A1 Jun. 25, 2020

(51) Int. Cl.
*H04W 76/28* (2018.01)
*H04W 52/02* (2009.01)
(Continued)

(52) U.S. Cl.
CPC ......... *H04W 76/28* (2018.02); *H04J 13/0062* (2013.01); *H04W 52/0216* (2013.01);
(Continued)

(58) Field of Classification Search
None
See application file for complete search history.

(56) References Cited

U.S. PATENT DOCUMENTS 7,966,017 B2 6/2011 Kim
9,473,276 B2 10/2016 Sajadieh et al.
(Continued)

FOREIGN PATENT DOCUMENTS

CN 101606426 A 12/2009
CN 104684050 A 6/2015
(Continued)

OTHER PUBLICATIONS

First Office Action of the Russian application No. 2020112736, dated Jan. 26, 2021.
(Continued)

*Primary Examiner* — Steve R Young
(74) *Attorney, Agent, or Firm* — Perkins Coie LLP

(57) ABSTRACT

Disclosed by the present application are a discontinuous reception method, a network device and a terminal device, the method comprising: a network device determining a first sequence corresponding to a terminal device according to information of a device group to which the terminal device belongs, the first sequence being used for instructing the terminal device to awaken or sleep within the activation period of a discontinuous reception (DRX) period after the first sequence; the terminal device belongs to a device group from among M device groups, and the first sequence corresponds to the device group to which the terminal device belongs, different device groups from among the M device groups corresponding to different first sequences; the network device sending a DRX instruction signal to the terminal device, the DRX instruction signal comprising the first sequence. The first sequence is related to specific information, such as the device group of the terminal device, and thus terminal devices of different attributes may effectively identify respective first sequences, and awaken or sleep
(Continued)

during the DRX period after the first sequence according to the instruction of the first sequence.

14 Claims, 4 Drawing Sheets

(51) Int. Cl.
| | | |
|---|---|---|
| *H04W 88/06* | (2009.01) | |
| *H04W 76/11* | (2018.01) | |
| *H04J 13/00* | (2011.01) | |
| *H04W 72/04* | (2009.01) | |

(52) U.S. Cl.
CPC ........ *H04W 72/0466* (2013.01); *H04W 76/11* (2018.02); *H04W 88/06* (2013.01)

(56) References Cited

U.S. PATENT DOCUMENTS

| | | | |
|---|---|---|---|
| 9,499,995 B2 | 11/2016 | Xiong et al. | |
| 9,544,042 B2 | 1/2017 | Li et al. | |
| 9,608,710 B2 | 3/2017 | Fwu et al. | |
| 9,681,354 B2 | 6/2017 | Bangolae et al. | |
| 9,730,208 B2 | 8/2017 | Cheng et al. | |
| 9,900,786 B2 | 2/2018 | Xiong et al. | |
| 2008/0090573 A1 | 4/2008 | Kim | |
| 2012/0115518 A1* | 5/2012 | Zeira | H04W 8/005 455/500 |
| 2013/0109301 A1* | 5/2013 | Hakola | H04W 76/14 455/39 |
| 2013/0258876 A1 | 10/2013 | Damji | |
| 2015/0043398 A1 | 2/2015 | Fwu | |
| 2015/0043403 A1 | 2/2015 | Martinez Tarradell | |
| 2015/0043445 A1 | 2/2015 | Xiong | |
| 2015/0043447 A1 | 2/2015 | Stojanovski | |
| 2015/0043449 A1 | 2/2015 | Bangolae | |
| 2015/0282057 A1 | 10/2015 | Li et al. | |
| 2015/0282208 A1* | 10/2015 | Yi | H04W 72/1289 370/329 |
| 2016/0014718 A1* | 1/2016 | Mysore Balasubramanya | H04W 52/0216 455/458 |
| 2016/0191135 A1 | 6/2016 | Chen et al. | |
| 2016/0315739 A1 | 10/2016 | Han et al. | |
| 2016/0373994 A1 | 12/2016 | Yiu | |
| 2017/0105127 A1 | 4/2017 | Kwon | |
| 2017/0202025 A1 | 7/2017 | Ouchi et al. | |
| 2017/0215169 A1 | 7/2017 | Lee et al. | |
| 2017/0289761 A1 | 10/2017 | Stojanovski et al. | |
| 2018/0343686 A1* | 11/2018 | Manepalli | H04W 76/28 |
| 2020/0022081 A1* | 1/2020 | Ljung | H04J 13/16 |
| 2020/0029302 A1* | 1/2020 | Cox | H04W 52/0235 |
| 2020/0163017 A1* | 5/2020 | Priyanto | H04W 88/04 |
| 2021/0153120 A1* | 5/2021 | Atungsiri | H04L 27/2613 |

FOREIGN PATENT DOCUMENTS

| | | |
|---|---|---|
| CN | 105359059 A | 2/2016 |
| CN | 106664130 A | 5/2017 |
| CN | 106664681 A | 5/2017 |
| CN | 106664736 A | 5/2017 |
| KR | 20140080280 A | 6/2014 |
| RU | 2438256 C2 | 12/2011 |
| RU | 2587464 C2 | 6/2016 |
| WO | 2009152367 A1 | 12/2009 |

OTHER PUBLICATIONS

First Office Action of the Chinese application No. 201780094475.3, dated Feb. 2, 2021.
First Office Action of the Korean application No. 10-2020-7009680, dated Mar. 24, 2021.
3GPP TSG RAN WG1 Meeting #90 R1-1712106, "On power-saving signal for eFeMTC", Huawei, Prague, Czech Republic, Aug. 21-25, 2017.
3GPP TSG RAN WG1 Meeting #90 R1-1712498, "Wake-up signal for efeMTC", Intel Corporation, Prague, Czech Republic, Aug. 21-25, 2017.
3GPP TSG RAN WG1 Meeting #90 R1-1712800, "Efficient monitoring of DL control channels", Qualcomm Incorporated, Prague, Czechia, Aug. 21-25, 2017.
First Office Action of the Canadian application No. 3074879, dated Apr. 21, 2021.
First Office Action of the Chilean application No. 202000562, dated May 19, 2021.
First Office Action of the Indian application No. 202017008354, dated Jun. 22, 2021.
First Office Action of the Japanese application No. 2020-513518, dated Jul. 13, 2021.
ZTE, "Power consumption reduction for physical channels for MTC", 3GPP TSG RAN WG1 #90 R1-1713014, 3GPP, Aug. 11, 2017.
Sequans Communications, "Discussion on wake-up signal for power consumption reduction for feNB-IoT", 3GPP TSG RAN WG1 #89 R1-1709161, 3GPP, May 10, 2017.
Guangdong OPPO Mobile Telecom, "Considerations on the DL power consumption reduction for efeMTC", 3GPP TSG RAN WG1 #90 R1-1713256, 3GPP, Aug. 11, 2017.
International Search Report in the international application No. PCT/CN2017/100957, dated Jun. 1, 2018.
"3rd Generation Partnership Project; Technical Specification Group GSM/EDGE Radio Access Network; Cellular system support for ultra-low complexity and low throughput Internet of Things (CIoT) (Release 13)", 3GPP Standard; 3GPP TR 45.820, 3rd Generation Partnership Project (3GPP), Mobile Competence Centre; 650, Route Des Lucioles; F-06921 Sophia-Antipolis Cedex; France, vol. GERAN WG1, No. V13.1.0, Dec. 18, 2015 (Dec. 18, 2015), pp. 1-495, XP051047128, [retrieved on Dec. 18, 2015].
Supplementary European Search Report in the European application No. 17924690.5, dated Aug. 10, 2020.
Written Opinion of the International Search Authority in the international application No. PCT/CN2017/100957, dated Jun. 1, 2018.
Written Opinion of the Singaporean application No. 112020020350, dated Sep. 6, 2021. 8 pages.

* cited by examiner

DISCONTINUOUS RECEPTION METHOD, NETWORK DEVICE AND TERMINAL DEVICE

CROSS-REFERENCE TO RELATED APPLICATIONS

The present application is a U.S. National Phase Entry of International PCT Application No. PCT/CN2017/100957 filed on Sep. 7, 2017, and named after "DISCONTINUOUS RECEPTION METHOD, NETWORK DEVICE AND TERMINAL DEVICE", the content of which is hereby incorporated by reference in its entirety.

TECHNICAL FIELD

Embodiments of the disclosure relate to the field of wireless communications, and more particularly to a Discontinuous Reception (DRX) method, a network device and a terminal device.

BACKGROUND

Considering power saving of a terminal device, a DRX mechanism is introduced. Each DRX cycle includes an on duration and an opportunity for DRX. During the on duration, the terminal device detects a control channel. During the opportunity for DRX, the terminal device may stop receiving the control channel (in such case, the terminal device may stop blind detection for the control channel) to reduce power consumption, thereby prolonging service time of a battery.

A network configures a DRX mechanism for a terminal device to enable the terminal device to periodically detect a control channel during the on duration. However, the terminal device is only opportunistically scheduled during the on duration, and the terminal device may even be scheduled only within a few DRX cycles under the circumstance that a service load is low. For a paging message for which the DRX mechanism is adopted, there are fewer opportunities for the terminal to receive the paging message. Therefore, after configuration of the DRX mechanism, the terminal device may not detect any control channel but still be woken up during most of on durations, which increases unnecessary power consumption.

SUMMARY

The embodiments of the disclosure provide a DRX method, a network device and a terminal device, which may reduce power consumption of the terminal device.

In a first aspect, there is provided a DRX method, which includes the following operations. A network device determines a first sequence corresponding to a terminal device according to information about a device group to which the terminal device belongs. The first sequence is to instruct the terminal device to wake up or sleep during an on duration in a DRX cycle after the first sequence. The terminal device belongs to a device group in M device groups. The first sequence corresponds to the device group to which the terminal device belongs. Each device group in the M device groups corresponds to a respective first sequence and M is a positive integer. The network device sends a DRX indication signal to the terminal device, where the DRX indication signal includes the first sequence, to enable the terminal device to wake up or sleep during the on duration in the DRX cycle after the first sequence according to the first sequence.

Accordingly, the network device sends DRX indication information containing the first sequence to the terminal device to indicate whether the terminal device is required to wake up in the DRX cycle after the first sequence or not and, under the condition that wakeup is not required, a sleep state is kept, so that power consumption is reduced. Design of the first sequence is related to specific information of the terminal device, for example, information of the device group to which the terminal device belongs, a Tracking Area (TA) group to which the terminal device belongs and a Physical Cell Identifier (PCI), so that terminal devices with different attributes may effectively identify respective first sequences and execute corresponding operations according to the first sequences.

In a possible implementation, before the operation that the network device determines the first sequence corresponding to the terminal device according to the information about the device group to which the terminal device belongs, the method may further include the following operation. The network device determines the device group to which the terminal device belongs according to a User Equipment Identity (UE-ID) of the terminal device or an access level of the terminal device.

In a possible implementation, M first sequences corresponding to the M device groups may be: M orthogonal sequences, or M Zadoff-Chu (ZC) sequences with different offset values.

In a possible implementation, the operation that the network device determines the first sequence corresponding to the terminal device according to the information about the device group to which the terminal device belongs may include the following action. The network device determines the first sequence corresponding to the terminal device according to the device group to which the terminal device belongs and a TA where the terminal device is located.

In a possible implementation, the terminal device may belong to a TA group in N TA groups, and M×N first sequences corresponding to M×N terminal devices belonging to different device groups and belonging to different TA groups in all terminal devices of the M device groups may be: M×N orthogonal sequences, or M×N ZC sequences with different offset values.

Alternatively, M first sequences corresponding to the M device groups may be M ZC sequences with different offset values, and the ZC sequences corresponding to the terminal devices belonging to different TA groups may be scrambled with respective first scrambling codes, each of the first scrambling codes is generated based on a respective one of the TA groups and N is a positive integer.

In a possible implementation, a serial number of the TA group to which the terminal device belongs may be mod (TA code, N), and TA code is a TA code of the TA where the terminal device is located.

In a possible implementation, the operation that the network device determines the first sequence corresponding to the terminal device according to the information about the device group to which the terminal device belongs may include the following action. The network device determines the first sequence corresponding to the terminal device according to the device group to which the terminal device belongs and a PCI of a cell where the terminal device is located.

In a possible implementation, each of multiple cells may correspond to a respective one of multiple initial sequences, the respective initial sequence corresponding to each of the multiple cells may be generated based on a PCI of the cell, each of the M device groups may correspond to a respective one of M second scrambling codes, and initial sequences corresponding to the terminal devices belonging to different device groups in each cell may be scrambled with respective second scrambling codes.

In a possible implementation, the operation that the network device sends the DRX indication signal for the terminal device to the terminal device may include the following action. The network device and other network devices in the TA simultaneously send the first sequence to the terminal device through a Single Frequency Network (SFN).

In a possible implementation, the operation that the network device and the other network devices in the TA simultaneously send the first sequence to the terminal device through the SFN may include the following action. The network device sends the first sequence to the terminal device by use of an Extended Cyclic Prefix (ECP).

In a possible implementation, the DRX indication signal may further include a second sequence, and before the operation that the network device sends DRX information to the terminal device, the method may further include the following operation. The network device generates the second sequence based on the PCI of the cell where the terminal device is located. The second sequence is used for time-frequency synchronization of the terminal device.

In a possible implementation, the first sequence may be ahead of the second sequence or behind of the second sequence in time domain.

In a possible implementation, the PCI of the cell where the terminal device is located may include any one of: a Primary Synchronization Signal (PSS) sequence or Secondary Synchronization Signal (SSS) sequence in a Long Term Evolution (LTE) system, a Narrow Band (NB) PSS sequence or NB SSS sequence in an NB Internet of Things (NB-IoT) system or a New Radio (NR) PSS sequence or NR SSS sequence in a 5th-Generation (5G) system.

In a second aspect, there is provided a DRX method, which may include the following operations. A terminal device receives a DRX indication signal sent by a network device, where the DRX indication signal includes a first sequence. The first sequence is to instruct the terminal device to wake up or sleep during an on duration in a DRX cycle after the first sequence. The terminal device belongs to a device group in M device groups. The first sequence corresponds to the device group to which the terminal device belongs. Each device group in the M device groups corresponds to a respective first sequence and M is a positive integer. The terminal device wakes up or sleeps during the on duration in the DRX cycle after the first sequence according to the first sequence.

Accordingly, the terminal device determines whether wakeup is required in the DRX cycle after the first sequence or not according to the first sequence sent by the network device and, under the condition that wakeup is not required, a sleep state is kept, so that power consumption is reduced. Design of the first sequence is related to specific information of the terminal device, for example, information of the device group to which the terminal device belongs, a TA group to which the terminal device belongs and a PCI, so that terminal devices with different attributes may effectively identify respective first sequences and execute corresponding operations according to the first sequences.

In a possible implementation, the device group to which the terminal device belongs may be determined according to a UE-ID of the terminal device or an access level of the terminal device.

In a possible implementation, M first sequences corresponding to the M device groups may be: M orthogonal sequences, or M ZC sequences with different offset values.

In a possible implementation, the first sequence corresponding to the terminal device may be determined according to the device group to which the terminal device belongs and a TA where the terminal device is located.

In a possible implementation, the terminal device may belong to a TA group in N TA groups, and M×N first sequences corresponding to M×N terminal devices belonging to different device groups and belonging to different TA groups in all terminal devices of the M device groups may be: M×N orthogonal sequences, or M×N ZC sequences with different offset values.

Alternatively, M first sequences corresponding to the M device groups may be M ZC sequences with different offset values, and the ZC sequences corresponding to the terminal devices belonging to different TA groups may be scrambled with respective first scrambling codes, each of the first scrambling codes is generated based on a respective one of the TA groups and N is a positive integer.

In a possible implementation, a serial number of the TA group to which the terminal device belongs may be mod (TA code, N), and TA code is a TA code of the TA where the terminal device is located.

In a possible implementation, the first sequence corresponding to the terminal device may be determined according to information about the device group to which the terminal device belongs and a PCI of a cell where the terminal device is located.

In a possible implementation, each of multiple cells may correspond to a respective one of multiple initial sequences, the respective initial sequence corresponding to each of the multiple cells may be generated based on a PCI of the cell, each of the M device groups may correspond to a respective one of M second scrambling codes, and initial sequences corresponding to the terminal devices belonging to different device groups in each cell may be scrambled with respective second scrambling codes.

In a possible implementation, the operation that the terminal device receives the DRX indication signal sent by the network device may include the following action. The terminal device receives the first sequence simultaneously sent by the network device and other network devices in the TA through an SFN.

In a possible implementation, the operation that the terminal device receives the first sequence simultaneously sent by the network device and the other network devices in the TA through the SFN may include the following action. The terminal device receives the first sequence sent by the network device by use of an ECP.

In a possible implementation, the DRX indication signal may further include a second sequence, the second sequence may be generated based on the PCI of the cell where the terminal device is located, and if the first sequence instructs the terminal device to wake up during the on duration in the DRX cycle after DRX information, the method may further include the following action. The terminal device performs time-frequency synchronization according to the second sequence.

In a possible implementation, the first sequence may be ahead of the second sequence or behind of the second sequence in time domain.

In a possible implementation, the PCI of the cell where the terminal device is located may include any one of: a PSS sequence or SSS sequence in an LTE system, an NB PSS sequence or NB SSS sequence in an NB-IoT system or an NR PSS sequence or NR SSS sequence in a 5G system.

In a third aspect, there is provided a network device, which may execute operations of a network device in the first aspect or any optional implementation of the first aspect. Specifically, the network device may include modular units configured to execute the operations of the network device in the first aspect or any possible implementation of the first aspect.

In a fourth aspect, there is provided a terminal device, which may execute operations of a terminal device in the second aspect or any optional implementation of the second aspect. Specifically, the terminal device may include modular units configured to execute the operations of the terminal device in the second aspect or any possible implementation of the second aspect.

In a fifth aspect, there is provided a network device, which includes a processor, a transceiver and a memory. Herein, the processor, the transceiver and the memory communicate with one another through an internal connecting path. The memory is configured to store instructions, and the processor is configured to execute the instructions stored in the memory. When the processor executes the instructions stored in the memory, such execution enables the network device to execute the method in the first aspect or any possible implementation of the first aspect, or such execution enables the network device to implement the network device provided in the third aspect.

In a sixth aspect, there is provided a terminal device, which includes a processor, a transceiver and a memory. Herein, the processor, the transceiver and the memory communicate with one another through an internal connecting path. The memory is configured to store instructions, and the processor is configured to execute the instructions stored in the memory. When the processor executes the instructions stored in the memory, such execution enables the terminal device to execute the method in the second aspect or any possible implementation of the second aspect, or such execution enables the terminal device to implement the terminal device provided in the fourth aspect.

In a seventh aspect, there is provided a computer-readable storage medium having stored therein a program, the program enabling a network device to execute the DRX method in any of the first aspect and various implementations thereof.

In an eighth aspect, there is provided a computer-readable storage medium having stored therein a program, the program enabling a terminal device to execute the DRX method in any of the second aspect and various implementations thereof.

In a ninth aspect, there is provided a system chip, which includes an input interface, an output interface, a processor and a memory. The processor is configured to execute instructions stored in the memory. When the instructions are executed, the processor may implement the method in the first aspect or any possible implementation of the first aspect.

In a tenth aspect, there is provided a system chip, which includes an input interface, an output interface, a processor and a memory. The processor is configured to execute instructions stored in the memory. When the instructions are executed, the processor may implement the method in the second aspect or any possible implementation of the second aspect.

In an eleventh aspect, there is provided a computer program product including instructions, which, when being executed on a computer, causes the computer to execute the method in the first aspect or any possible implementation of the first aspect.

In a twelfth aspect, there is provided a computer program product including instructions, which, when being executed on a computer, causes the computer to execute the method in the second aspect or any possible implementation of the second aspect.

DETAILED DESCRIPTION

The technical solutions in the embodiments of the disclosure will be described below in combination with the drawings.

It is to be understood that the technical solutions in the embodiments of the disclosure may be applied to various communication systems, for example, a Global System of Mobile Communication (GSM) system, a Code Division Multiple Access (CDMA) system, a Wideband Code Division Multiple Access (WCDMA) system, an LTE system, an LTE Frequency Division Duplex (FDD) system, an LTE Time Division Duplex (TDD) system, a Universal Mobile Telecommunication System (UMTS) and a future 5G communication system.

Each embodiment of the disclosure is described in combination with a terminal device. The terminal device may refer to User Equipment (UE), an access terminal, a user unit, a user station, a mobile radio station, a mobile station, a remote station, a remote terminal, a mobile device, a user terminal, a terminal, a wireless communication device, a user agent, a user device or the like. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

Each embodiment of the disclosure is described in combination with a network device. The network device may be a device configured to communicate with the terminal device, for example, may be a Base Transceiver Station (BTS) in the GSM system or the CDMA system, may also be a NodeB (NB) in the WCDMA system and may also be an Evolutional Node B (eNB or eNodeB) in the LTE system. The network device may be a relay station, an access point, a vehicle-mounted device, a wearable device, a network-side device in the future 5G network, a network-side device in the future evolved PLMN or the like.

Figure 1:
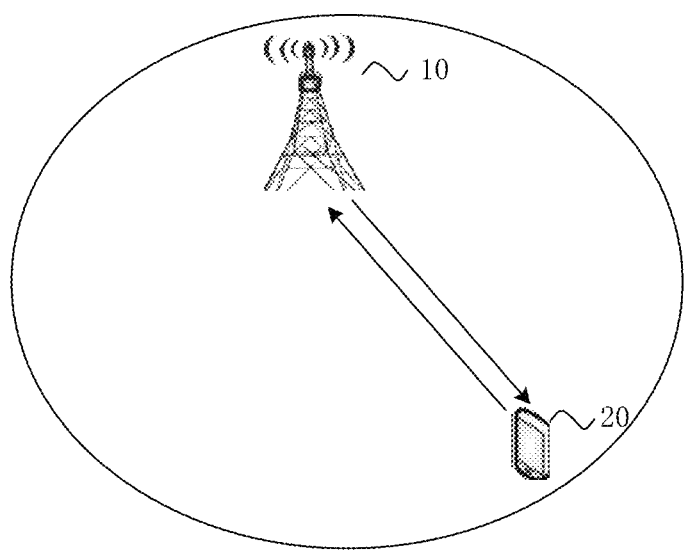
FIG. 1 is a schematic architecture diagram showing an application scenario according to an embodiment of the disclosure.

FIG. 1 is a schematic diagram showing an application scenario according to an embodiment of the disclosure. A communication system in FIG. 1 may include a network device 10 and a terminal device 20. The network device 10 is configured to provide communication service for the terminal device 20 for access to a core network. The terminal device 20 may search a synchronization signal, broadcast signal and the like sent by the network device 10 to access the network, thereby communicating with the network. Arrows shown in FIG. 1 may represent uplink/downlink transmissions through a cellular link between the terminal device 20 and the network device 10.

The network in the embodiments of the disclosure may refer to a PLMN, a Device to Device (D2D) network, a Machine to Machine/Man (M2M) network or another network. FIG. 1 is only an exemplary simplified schematic diagram. The network may further include other terminal devices which are not presented in FIG. 1.

Figure 2:
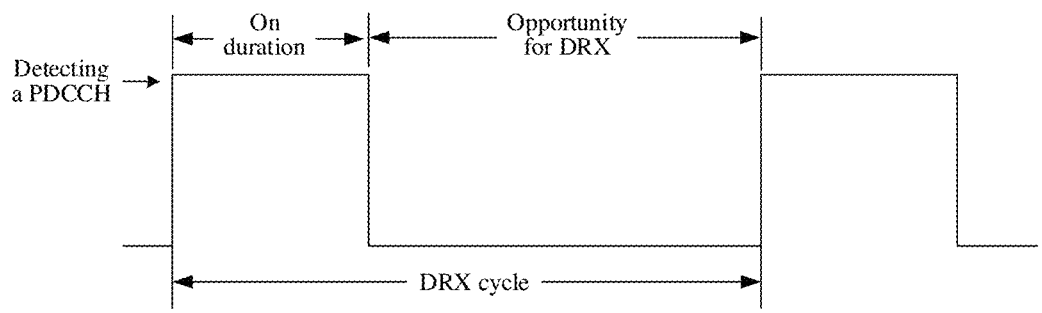
FIG. 2 is a schematic diagram showing a DRX cycle.

A DRX cycle for the terminal device includes an on duration and an opportunity for DRX. For example, as shown in FIG. 2, the terminal device may detect (or monitor) a Physical Downlink Control Channel (PDCCH) during the on duration, and the terminal device may stop receiving the PDCCH (in such case, the terminal device may stop blind detection for the PDCCH or a paging message) during the opportunity for DRX to reduce power consumption, thereby prolonging service time of a battery. That is, the terminal device is in a wakeup state and thus detects the PDCCH during the on duration, and the terminal device enters a sleep state and thus stops channel or signal detection during the opportunity for DRX.

The network configures the DRX cycle for the terminal device to enable the terminal device to periodically detect the PDCCH during the on duration. However, the terminal device is only opportunistically scheduled during the on duration, and the terminal device may even be scheduled only during a few DRX cycles under the condition that a service load is low. For a paging message for which the DRX mechanism is adopted, there are fewer opportunities for the terminal to receive the paging message. Therefore, after configuration of the DRX mechanism, the terminal device may not detect any control channel during on durations of most of DRX cycles but may still be woken up during the on durations of these DRX cycles, which increases unnecessary power consumption of the terminal device.

Accordingly, in the embodiments of the disclosure, the terminal device determines whether wakeup is required in a DRX cycle after a first sequence or not according to the first sequence sent by the network device and, under the condition that wakeup is not required, a sleep state is kept to reduce power consumption. Design of the first sequence is related to specific information of the terminal device, for example, information of a device group to which the terminal device belongs, a TA group to which the terminal device belongs and a PCI, so that terminal devices with different attributes may effectively identify respective first sequences and execute corresponding operations according to the first sequences.

The embodiments of the disclosure may not only be applied to the detection of the PDCCH but also be applied to the detection of the paging message. A DRX mechanism in a Radio Resource Control (RRC) idle state is also adopted for transmission of a paging message, and in such case, the DRX cycle is a paging cycle. A Paging Frame (PF) is a specific radio frame or system frame. The terminal device may try to receive the paging message in a specific subframe, i.e., a Paging Occasion (PO) in the PF. The PDCCH scrambled with a Paging Radio Network Temporary Identity (P-RNTI) and indicating the paging message may be transmitted in the PO. With adoption of DRX, the terminal device is required to detect only one PO in each DRX cycle. That is, for each terminal device, only one subframe in each DRX cycle may be used to send the paging message, the PF is the system frame used to send the paging message, and the PO is the subframe used to send the paging message in the PF.

Figure 3:
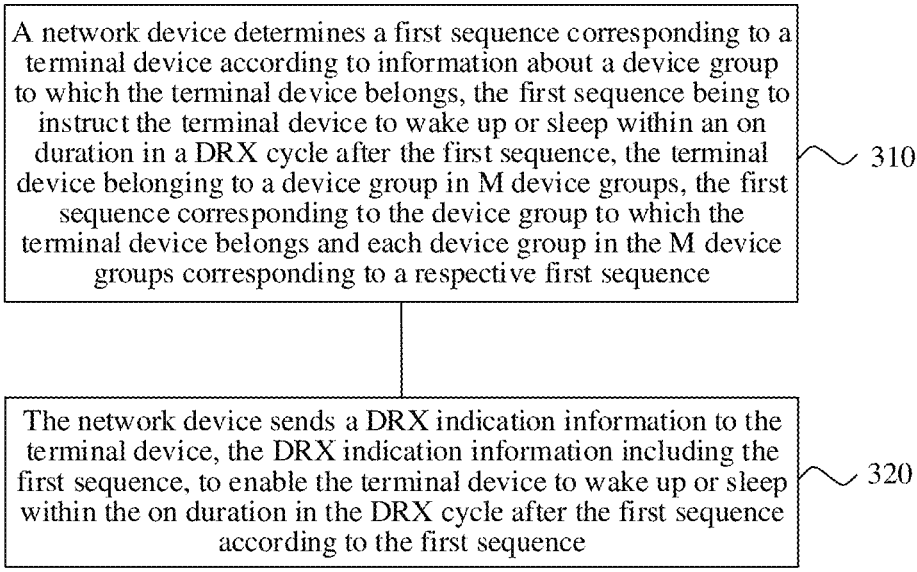
FIG. 3 is a schematic flowchart showing a DRX method according to an embodiment of the disclosure.

FIG. 3 is a schematic flowchart showing a DRX method according to an embodiment of the disclosure. The method shown in FIG. 3 may be executed by a network device. The network device may be, for example, the network device 10 shown in FIG. 1. As shown in FIG. 3, the DRX method includes the following operations.

At 310, the network device determines a first sequence corresponding to a terminal device according to information about a device group to which the terminal device belongs.

The first sequence is used to instruct the terminal device to wake up or sleep during an on duration in a DRX cycle after the first sequence. The terminal device belongs to one of M device groups, the first sequence corresponds to the device group to which the terminal device belongs, and each device group in the M device groups corresponds to a respective first sequence.

At 320, the network device sends a DRX indication signal to the terminal device. The DRX indication signal includes the first sequence, to enable the terminal device to wake up or sleep during the on duration in the DRX cycle after the first sequence.

Specifically, each device group in the M device groups corresponds to a respective first sequence, the network device sends different first sequences to terminal devices in different device groups, and terminal devices belonging to different device groups in the M device groups receive different first sequences. The network device instructs the terminal device through the first sequence to wake up or sleep during on durations in one or more DRX cycles thereafter. The first sequence sent to the terminal device is related to the information about the device group to which the terminal device belongs, and the network device determines the first sequence corresponding to the terminal device according to the information about the device group to which the terminal device belongs and sends the DRX indication signal containing the first sequence to the terminal device, so that the terminal device, after detecting the DRX indication signal, determines whether to wake up or sleep during the on duration in the DRX cycle thereafter according to the first sequence.

Optionally, before 310, namely before the operation that the network device determines the first sequence corresponding to the terminal device according to the information about the device group to which the terminal device belongs, the method further includes the following operation. The network device determines the device group to which the terminal device belongs according to a UE-ID of the terminal device or an access level of the terminal device.

For example, a numerical value obtained by mod (UE-ID, M), or recorded as (UE-ID) mod M, is a serial number of the device group to which the terminal device belongs, where M is the total number of the device groups.

The embodiment of the disclosure provides three manners for determining the first sequence corresponding to the terminal device. Descriptions will be made below respectively.

A First Manner

Optionally, the network device directly determines the first sequence corresponding to the terminal device according to the device group to which the terminal device belongs.

For example, there are M device groups, and each device group includes at least one terminal device. The M device groups correspond to M first sequences, and the M first sequences are M orthogonal sequences or the M first sequences are M ZC sequences with different offset values. Each of the M device groups may correspond to a respective one of the M first sequences, or each of the M device groups corresponds to a respective one of the M ZC sequences with different offset values.

The network device determines, according to the device group to which the terminal device belongs and a mapping relationship between M device groups and M orthogonal sequences, that the first sequence corresponding to the terminal device is the orthogonal sequence corresponding to the device group to which the terminal device belongs in the M orthogonal sequences.

Alternatively, the network device determines, according to the device group to which the terminal device belongs and a mapping relationship between M device groups and M ZC sequences with different offset values, that the first sequence corresponding to the terminal device is the ZC sequence corresponding to the device group to which the terminal device belongs in the M ZC sequences with different offset values.

A Second Manner

Optionally, the operation that the network device determines the first sequence corresponding to the terminal device according to the information about the device group to which the terminal device belongs includes the following action. The network device determines the first sequence corresponding to the terminal device according to the device group to which the terminal device belongs and a paging area or TA where the terminal device is located.

Since the TA where the terminal device is located is considered, terminal devices in different TAs may correspond to different first sequences. Therefore, mutual interference of the terminal devices in different TAs during detection of DRX indication signals is reduced.

Optionally, the terminal device belongs to a TA group in N TA groups. M×N first sequences corresponding to M×N terminal devices belonging to different device groups and belonging to different TA groups in all terminal devices of the M device groups are M×N orthogonal sequences or M×N ZC sequences with different offset values. Optionally, the M first sequences corresponding to the M device groups are M ZC sequences with different offset values, and the ZC sequences corresponding to the terminal devices belonging to different TA groups are scrambled with respective first scrambling codes. The different first scrambling codes are generated based on the TA groups.

For example, each of the M×N terminal devices belonging to different device groups and belonging to different TA groups corresponds to a respective one of the M×N orthogonal sequences. Alternatively, each of the M×N terminal devices belonging to different device groups and belonging to different TA groups corresponds to a respective one of the M×N ZC sequences with different offset values.

Specifically, the terminal devices may be divided into N TA groups according to TAs of the terminal devices while the terminal devices are divided into M device groups, and each TA group includes the terminal devices in at least one TA. The first sequences corresponding to the terminal devices belonging to different device groups and belonging to different TA groups are configured to be different first sequences. For example, a serial number of the TA group to which the terminal device belongs may be mod (TA code, N), or recorded as (TA code) mod N, TA code being a TA code of the TA where the terminal device is located.

One manner is that the M×N terminal devices belonging to different device groups and belonging to different TA groups are correlated with M×N first sequences and the M×N first sequences are M×N orthogonal sequences or M×N ZC sequences with different offset values.

Another manner is that the M first sequences corresponding to the M device groups are configured to be M ZC sequences with different offset values and the ZC sequences corresponding to the terminal devices belonging to different TA groups are scrambled with respective first scrambling codes based on the TA groups of the terminal devices.

In such a manner, not only the terminal devices belonging to different device groups correspond to different first sequences, but also the terminal devices belonging to different TA groups correspond to different first sequences, so that influence between DRX indication signals for the terminal devices in different TA groups may be avoided.

A Third Manner

Optionally, the operation that the network device determines the first sequence corresponding to the terminal device according to the information about the device group to which the terminal device belongs includes the following action. The network device determines the first sequence corresponding to the terminal device according to the device group to which the terminal device belongs and PCI of a cell where the terminal device is located.

Since the first sequence corresponding to the terminal device may also be generated based on the PCI of the cell where the terminal device is located, the first sequence may be used for the terminal device to perform cell synchronization for subsequent data transmission.

Optionally, each of multiple cells corresponds to a respective one of multiple initial sequences, and the respective initial sequence corresponding to each of the multiple cells is generated based on a PCI of the cell. Each of the M device groups corresponds to a respective one of M second scrambling codes, and initial sequences corresponding to the terminal devices belonging to different device groups in each cell are scrambled with respective second scrambling codes.

Specifically, the network device, when generating the first sequence corresponding to the terminal device, may further consider the PCI corresponding to the terminal device based on consideration of the device group to which the terminal device belongs. Each of the multiple cells corresponds to a respective one of multiple PCIs, and an initial sequence for each cell is generated according to PCI of the cell. The network device may generate the initial sequence according to the PCI of the cell where a certain terminal device is located, determine the second scrambling code corresponding to a device group to which the terminal device belongs according to the device group and scramble the generated initial sequence by use of the second scrambling code, thereby obtaining the first sequence to be sent to the terminal device. That is, for terminal devices in a certain cell, different second scrambling codes are used to scramble initial sequences of the terminal devices belonging to different device groups, and the initial sequences are generated based on the PCI of the cell.

Optionally, the PCI of the cell where the terminal device is located includes any one of: a PSS sequence or SSS sequence in an LTE system, an NB PSS sequence or NB SSS sequence in an NB-IoT system or an NR PSS sequence or NR SSS sequence in a 5G system.

Optionally, the operation in 320 that the network device sends the DRX indication signal to the terminal device includes the following action. The network device and other network devices in the TA where the terminal device is located simultaneously send the first sequence to the terminal device through an SFN.

Furthermore, optionally, the operation that the network device and the other network devices in the TA simultaneously send the first sequence to the terminal device through the SFN includes the following action. The network device sends the first sequence to the terminal device by use of an ECP.

Specifically, the network device may send the first sequence to the terminal device by use of a normal CP or the ECP.

The DRX indication signal sent to the terminal device by the network device in 320 may further contain a second sequence, besides the first sequence. For the first manner and the second manner, optionally, before 320, namely before the operation that the network device sends the DRX signal to the terminal device, the method further includes the following operation. The network device generates the second sequence based on the PCI of the cell where the terminal device is located. The second sequence is used for time-frequency synchronization of the terminal device.

The first sequence may be ahead of the second sequence or behind of the second sequence in time domain.

Preferably, the first sequence is ahead of the second sequence, and in such case, if the terminal device, after detecting the DRX indication signal, determines according to the first sequence therein that wakeup is subsequently required, the terminal device may directly perform time-frequency synchronization by use of the second sequence, so that subsequent data transmission during the on duration is facilitated.

Accordingly, in the embodiment of the disclosure, the network device sends the DRX indication signal containing the first sequence to the terminal device to indicate whether the terminal device is required to wake up in the DRX cycle after the first sequence or not and, under the condition that wakeup is not required, a sleep state is kept, so that power consumption is reduced. Design of the first sequence is related to specific information of the terminal device, for example, information of the device group to which the terminal device belongs, a TA group to which the terminal device belongs and a PCI, so that terminal devices with different attributes may effectively identify respective first sequences and execute corresponding operations according to the first sequences.

Figure 4:
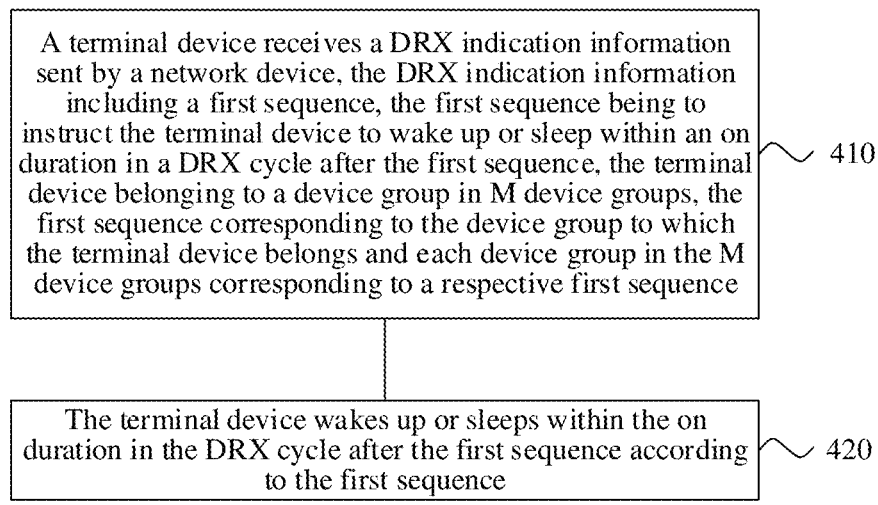
FIG. 4 is a schematic flowchart showing a DRX method according to another embodiment of the disclosure.

FIG. 4 is a schematic flowchart showing a DRX method according to an embodiment of the disclosure. The method shown in FIG. 4 may be executed by a terminal device. The terminal device may be, for example, a terminal device 20 shown in FIG. 1. As shown in FIG. 4, the DRX method includes the following operations.

At 410, the terminal device receives a DRX indication signal sent by a network device. The DRX indication signal includes a first sequence, and the first sequence is to instruct the terminal device to wake up or sleep during an on duration in a DRX cycle after the first sequence. The terminal device belongs to a device group in M device groups, the first sequence corresponds to the device group to which the terminal device belongs and each device group in the M device groups corresponds to a respective first sequence.

At 420, the terminal device wakes up or sleeps during the on duration in the DRX cycle after the first sequence according to the first sequence.

Accordingly, in the embodiment of the disclosure, the terminal device determines whether wakeup is required in a DRX cycle after a first sequence or not according to the first sequence sent by the network device and, under the condition that wakeup is not required, a sleep state is kept, so that power consumption is reduced. Design of the first sequence is related to specific information of the terminal device, for example, information of the device group to which the terminal device belongs, a TA group to which the terminal device belongs and a PCI, so that terminal devices with different attributes may effectively identify respective first sequences and execute corresponding operations according to the first sequences.

Optionally, the device group to which the terminal device belongs is determined according to a UE-ID of the terminal device or an access level of the terminal device.

Optionally, M first sequences corresponding to the M device groups are M orthogonal sequences or M ZC sequences with different offset values.

Optionally, the first sequence corresponding to the terminal device is determined according to the device group to which the terminal device belongs and a TA where the terminal device is located.

Optionally, the terminal device belongs to a TA group in N TA groups, and M×N first sequences corresponding to M×N terminal devices belonging to different device groups and belonging to different TA groups in all terminal devices of the M device groups are M×N orthogonal sequences or M×N ZC sequences with different offset values.

Alternatively, the M first sequences corresponding to the M device groups are M ZC sequences with different offset values, and the ZC sequences corresponding to the terminal devices belonging to different TA groups are scrambled with respective first scrambling codes. Each of the first scrambling codes is generated based on a respective one of the TA groups.

Optionally, a serial number of the TA group to which the terminal device belongs is mod (TA code, N), and TA code is a TA code of the TA where the terminal device is located.

Optionally, the first sequence corresponding to the terminal device is determined according to information about the device group to which the terminal device belongs and a PCI of a cell where the terminal device is located.

Optionally, each of multiple cells corresponds to a respective one of multiple initial sequences, the respective initial sequence corresponding to each of the multiple cells is generated based on a PCI of the cell, each of the M device groups corresponds to a respective one of M second scrambling codes, and initial sequences corresponding to the terminal devices belonging to different device groups in each cell are scrambled with respective second scrambling codes.

Optionally, the operation that the terminal device receives the DRX indication signal sent by the network device includes the following action. The terminal device receives the first sequence simultaneously sent by the network device and other network devices in the TA through an SFN.

Optionally, the operation that the terminal device receives the first sequence simultaneously sent by the network device and the other network devices in the TA through the SFN includes the following action. The terminal device receives the first sequence sent by the network device by use of an ECP.

Optionally, the DRX indication signal further includes a second sequence, and the second sequence is generated based on the PCI of the cell where the terminal device is located. If the first sequence instructs the terminal device to wake up during the on duration in the DRX cycle after DRX information, the method further includes the following action. The terminal device performs time-frequency synchronization according to the second sequence.

Optionally, the first sequence is ahead of the second sequence or behind of the second sequence in time domain.

Optionally, the PCI of the cell where the terminal device is located includes any one of: a PSS sequence or SSS sequence in an LTE system, an NB PSS sequence or NB SSS sequence in an NB-IoT system or an NR PSS sequence or NR SSS sequence in a 5G system.

Figure 5:
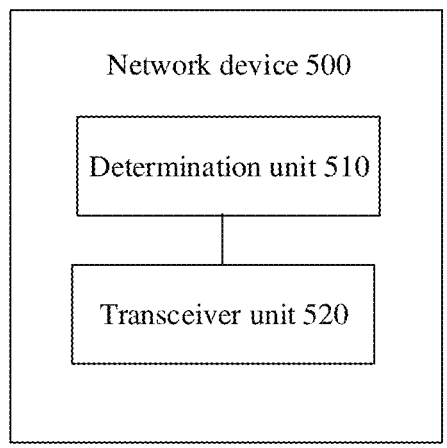
FIG. 5 is a schematic block diagram showing a network device according to an embodiment of the disclosure.

It is to be understood that specific details about the operation that the terminal device receives the DRX indication signal and executes corresponding operations according to the first sequence and second sequence therein may refer to related descriptions about the network device in FIG. 3 to FIG. 5. For simplicity, elaborations are omitted herein.

It is also to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

FIG. 5 is a schematic block diagram showing a network device 500 according to an embodiment of the disclosure. As shown in FIG. 5, the network device 500 includes a determination unit 510 and a transceiver unit 520.

The determination unit 510 is configured to determine a first sequence corresponding to a terminal device according to information about a device group to which the terminal device belongs. The first sequence is to instruct the terminal device to wake up or sleep during an on duration in a DRX cycle after the first sequence. The terminal device belongs to a device group in M device groups. The first sequence corresponds to the device group to which the terminal device belongs, each device group in the M device groups corresponds to a respective first sequence and M is a positive integer.

The transceiver unit 520 is configured to send a DRX indication signal to the terminal device. The DRX indication signal includes the first sequence determined by the determination unit, to enable the terminal device to wake up or sleep during the on duration in the DRX cycle after the first sequence.

Accordingly, the network device sends the DRX indication signal containing the first sequence to the terminal device to indicate whether the terminal device is required to wake up in the DRX cycle after the first sequence or not and, under the condition that wakeup is not required, a sleep state is kept, so that power consumption is reduced. Design of the first sequence is related to specific information of the terminal device, for example, information of the device group to which the terminal device belongs, a TA group to which the terminal device belongs and a PCI, so that terminal devices with different attributes may effectively identify respective first sequences and execute corresponding operations according to the first sequences.

Optionally, the determination unit 510 is further configured to determine the device group to which the terminal device belongs according to a UE-ID of the terminal device or an access level of the terminal device.

Optionally, M first sequences corresponding to the M device groups are: M orthogonal sequences, or M ZC sequences with different offset values.

Optionally, the determination unit 510 is specifically configured to determine the first sequence corresponding to the terminal device according to the device group to which the terminal device belongs and a TA where the terminal device is located.

Optionally, the terminal device belongs to a TA group in N TA groups, and M×N first sequences corresponding to M×N terminal devices belonging to different device groups and belonging to different TA groups in all terminal devices of the M device groups are: M×N orthogonal sequences, or M×N ZC sequences with different offset values.

Alternatively, M first sequences corresponding to the M device groups are M ZC sequences with different offset values, and the ZC sequences corresponding to the terminal devices belonging to different TA groups are scrambled with respective first scrambling codes, each of the first scrambling codes is generated based on a respective one of the TA groups.

Optionally, a serial number of the TA group to which the terminal device belongs is mod (TA code, N), and TA code is a TA code of the TA where the terminal device is located.

Optionally, the determination unit 510 is specifically configured to determine the first sequence corresponding to the terminal device according to the device group to which the terminal device belongs and a PCI of a cell where the terminal device is located.

Optionally, each of multiple cells corresponds to a respective one of multiple initial sequences, the respective initial sequence corresponding to each of the multiple cells is generated based on a PCI of the cell, each of the M device groups corresponds to a respective one of M second scrambling codes, and initial sequences corresponding to the terminal devices belonging to different device groups in each cell are scrambled with respective second scrambling codes.

Optionally, the transceiver unit 520 is specifically configured to send the first sequence to the terminal device simultaneously with other network devices in the TA through an SFN.

Optionally, the transceiver unit 520 is specifically configured to send, by the network device, the first sequence to the terminal device by use of an ECP.

Optionally, the DRX indication signal further includes a second sequence, the network device further includes a processing unit, and the processing unit is configured to generate the second sequence based on the PCI of the cell where the terminal device is located. The second sequence is used for time-frequency synchronization of the terminal device.

Optionally, the first sequence is ahead of the second sequence or behind of the second sequence in time domain.

Optionally, the PCI of the cell where the terminal device is located includes any one of: a PSS sequence or SSS sequence in an LTE system, an NB PSS sequence or NB SSS sequence in an NB-IoT system or an NR PSS sequence or NR SSS sequence in a 5G system.

Figure 6:
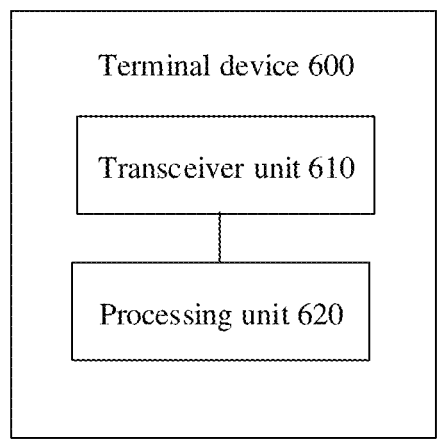
FIG. 6 is a schematic block diagram showing a terminal device according to an embodiment of the disclosure.

FIG. 6 is a schematic block diagram showing a terminal device 600 according to an embodiment of the disclosure. As shown in FIG. 6, the terminal device 600 includes a transceiver unit 610 and a processing unit 620.

The transceiver unit 610 is configured to receive a DRX indication signal sent by a network device. The DRX indication signal includes a first sequence, and the first sequence is to instruct the terminal device to wake up or sleep during an on duration in a DRX cycle after the first sequence. The terminal device belongs to a device group in M device groups. The first sequence corresponds to the device group to which the terminal device belongs, and each device group in the M device groups corresponds to a respective first sequence.

The processing unit 620 is configured to wake up or sleep during the on duration in the DRX cycle after the first sequence according to the first sequence received by the transceiver unit 610.

Accordingly, the terminal device determines whether wakeup is required in the DRX cycle after the first sequence or not through the first sequence sent by the network device and, under the condition that wakeup is not required, a sleep state is kept, so that power consumption is reduced. Design of the first sequence is related to specific information of the terminal device, for example, information of the device group to which the terminal device belongs, a TA group to which the terminal device belongs and a PCI, so that terminal devices with different attributes may effectively identify respective first sequences and execute corresponding operations according to the first sequences.

Optionally, the device group to which the terminal device belongs is determined according to a UE-ID of the terminal device or an access level of the terminal device.

Optionally, M first sequences corresponding to the M device groups are: M orthogonal sequences, or M ZC sequences with different offset values.

Optionally, the first sequence corresponding to the terminal device is determined according to the device group to which the terminal device belongs and a TA where the terminal device is located.

Optionally, the terminal device belongs to a TA group in N TA groups, and M×N first sequences corresponding to M×N terminal devices belonging to different device groups and belonging to different TA groups in all terminal devices of the M device groups are: M×N orthogonal sequences, or M×N ZC sequences with different offset values.

Alternatively, M first sequences corresponding to the M device groups are M ZC sequences with different offset values, and the ZC sequences corresponding to the terminal devices belonging to different TA groups are scrambled with respective first scrambling codes. Each of the first scrambling codes is generated based on a respective one of the TA groups.

Optionally, a serial number of the TA group to which the terminal device belongs is mod (TA code, N), and TA code is a TA code of the TA where the terminal device is located.

Optionally, the first sequence corresponding to the terminal device is determined according to information about the device group to which the terminal device belongs and a PCI of a cell where the terminal device is located.

Optionally, each of multiple cells corresponds to a respective one of multiple initial sequences, the respective initial sequence corresponding to each of the multiple cells is generated based on a PCI of the cell, each of the M device groups corresponds to a respective one of M second scrambling codes, and initial sequences corresponding to the terminal devices belonging to different device groups in each cell are scrambled with respective second scrambling codes.

Optionally, the transceiver unit 610 is specifically configured to receive the first sequence simultaneously sent by the network device and other network devices in the TA through an SFN.

Optionally, the transceiver unit 610 is specifically configured to receive the first sequence sent by the network device by use of an ECP.

Optionally, the DRX indication signal further includes a second sequence, the second sequence is generated based on the PCI of the cell where the terminal device is located, and if the first sequence instructs the terminal device to wake up during the on duration in the DRX cycle after DRX information, the processing unit 620 is further configured to perform time-frequency synchronization according to the second sequence.

Optionally, the first sequence is ahead of the second sequence or behind of the second sequence in time domain.

Optionally, the PCI of the cell where the terminal device is located includes any one of: a PSS sequence or SSS sequence in an LTE system, an NB PSS sequence or NB SSS sequence in an NB-IoT system or an NR PSS sequence or NR SSS sequence in a 5G system.

Figure 7:
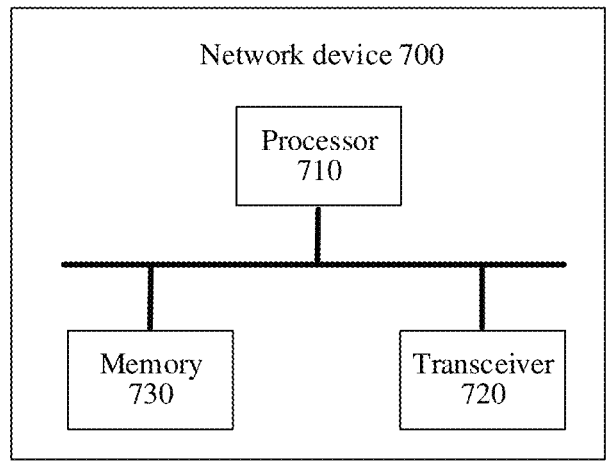
FIG. 7 is a schematic structure diagram showing a network device according to an embodiment of the disclosure.

FIG. 7 is a schematic structure diagram showing a network device 700 according to an embodiment of the disclosure. As shown in FIG. 7, the network device includes a processor 710, a transceiver 720 and a memory 730. Herein, the processor 710, the transceiver 720 and the memory 730 communicate with one another through an internal connecting path. The memory 730 is configured to store instructions, and the processor 710 is configured to execute the instructions stored in the memory 730 to control the transceiver 720 to receive a signal or send a signal.

The processor 710 is configured to: determine a first sequence corresponding to a terminal device according to information about a device group to which the terminal device belongs. The first sequence is to instruct the terminal device to wake up or sleep during an on duration in a DRX cycle after the first sequence. The terminal device belongs to a device group in M device groups. The first sequence corresponds to the device group to which the terminal device belongs and each device group in the M device groups corresponding to a respective first sequence.

The transceiver 720 is configured to send a DRX indication signal to the terminal device. The DRX indication signal includes the first sequence determined by the determination unit, to enable the terminal device to wake up or sleep during the on duration in the DRX cycle after the first sequence.

Accordingly, the network device sends the DRX indication signal containing the first sequence to the terminal device to indicate whether the terminal device is required to wake up in the DRX cycle after the first sequence or not and, under the condition that wakeup is not required, a sleep state is kept, so that power consumption is reduced. Design of the first sequence is related to specific information of the terminal device, for example, information of the device group to which the terminal device belongs, a TA group to which the terminal device belongs and a PCI, so that terminal devices with different attributes may effectively identify respective first sequences and execute corresponding operations according to the first sequences.

Optionally, the processor 710 is further configured to determine the device group to which the terminal device belongs according to a UE-ID of the terminal device or an access level of the terminal device.

Optionally, M first sequences corresponding to the M device groups are: M orthogonal sequences, or M ZC sequences with different offset values.

Optionally, the processor 710 is specifically configured to determine the first sequence corresponding to the terminal device according to the device group to which the terminal device belongs and a TA where the terminal device is located.

Optionally, the terminal device belongs to a TA group in N TA groups, and M×N first sequences corresponding to M×N terminal devices belonging to different device groups and belonging to different TA groups in all terminal devices of the M device groups are: M×N orthogonal sequences, or M×N ZC sequences with different offset values.

Alternatively, M first sequences corresponding to the M device groups are M ZC sequences with different offset values, and the ZC sequences corresponding to the terminal devices belonging to different TA groups are scrambled with respective first scrambling codes, each of the first scrambling codes is generated based on a respective one of the TA groups.

Optionally, a serial number of the TA group to which the terminal device belongs is mod (TA code, N), and TA code is a TA code of the TA where the terminal device is located.

Optionally, the processor 710 is specifically configured to determine the first sequence corresponding to the terminal device according to the device group to which the terminal device belongs and a PCI of a cell where the terminal device is located.

Optionally, each of multiple cells correspond to a respective one of multiple initial sequences, the respective initial sequence corresponding to each of the multiple cells is generated based on a PCI of the cell, each of the M device groups corresponds to a respective one of M second scrambling codes, and initial sequences corresponding to the terminal devices belonging to different device groups in each cell are scrambled with respective second scrambling codes.

Optionally, the transceiver 720 is specifically configured to send the first sequence to the terminal device simultaneously with other network devices in the TA through an SFN.

Optionally, the transceiver 720 is specifically configured to send, by the network device, the first sequence to the terminal device by use of an ECP.

Optionally, the DRX indication signal further includes a second sequence, the network device further includes a processing unit, and the processing unit is configured to generate the second sequence based on the PCI of the cell where the terminal device is located. The second sequence is used for time-frequency synchronization of the terminal device.

Optionally, the first sequence is ahead of the second sequence or behind of the second sequence in time domain.

Optionally, the PCI of the cell where the terminal device is located includes any one of: a PSS sequence or SSS sequence in an LTE system, an NB PSS sequence or NB SSS sequence in an NB-IoT system or an NR PSS sequence or NR SSS sequence in a 5G system.

It is to be understood that, in the embodiment of the disclosure, the processor 710 may be a Central Processing Unit (CPU), and the processor 710 may also be another universal processor, a Digital Signal Processor (DSP), an Application Specific Integrated Circuit (ASIC), a Field Programmable Gate Array (FPGA) or another programmable logic device, a discrete gate or transistor logic device, a discrete hardware component and the like. The universal processor may be a microprocessor or the processor may also be any conventional processor and the like.

The memory 730 may include a Read-Only Memory (ROM) and a Random Access Memory (RAM) and provides an instruction and data for the processor 710. A portion of the memory 730 may further include a nonvolatile RAM.

In an implementation process, each step in the method may be completed by an integrated logic circuit in a hardware form in the processor 710 or instructions in a software form. The steps of the method disclosed in combination with the embodiments of the disclosure may be directly embodied to be executed and completed by a hardware processor or executed and completed by a combination of software modules and the hardware in the processor 710. The software modules may be located in a mature storage medium in this field such as a RAM, a flash memory, a ROM, a programmable ROM, an electrically erasable programmable ROM, or a register. The storage medium is located in the memory 730. The processor 710 reads information in the memory 730 and completes the steps of the method in combination with the hardware therein. No more detailed descriptions will be made herein to avoid repetitions.

The network device 700 according to the embodiment of the disclosure may correspond to the network device configured to execute the method 300 and the network device 500 according to the embodiment of the disclosure, and each unit or module in the network device 700 is configured to execute the operation or processing process executed by the network device in the method 300. Herein, for avoiding elaborations, detailed descriptions thereof are omitted.

Figure 8:
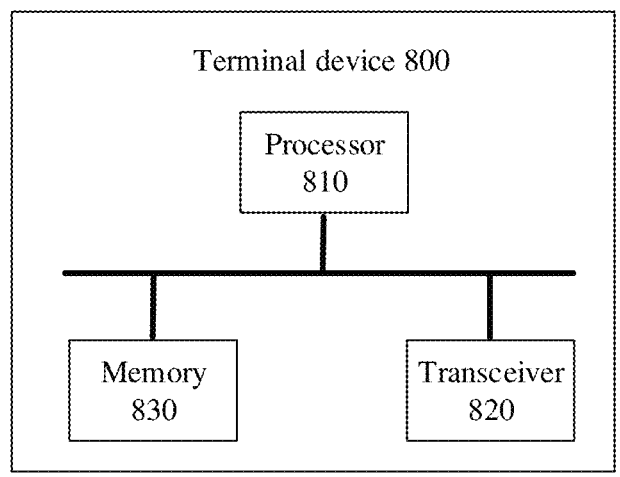
FIG. 8 is a schematic structure diagram showing a terminal device according to an embodiment of the disclosure.

FIG. 8 is a schematic structure diagram showing a terminal device 800 according to an embodiment of the disclosure. As shown in FIG. 8, the terminal device includes a processor 810, a transceiver 820 and a memory 830. Herein, the processor 810, the transceiver 820 and the memory 830 communicate with one another through an internal connecting path. The memory 830 is configured to store instructions, and the processor 810 is configured to execute the instructions stored in the memory 830 to control the transceiver 820 to receive a signal or send a signal.

The transceiver 820 is configured to receive a DRX indication signal sent by a network device. The DRX indication signal includes a first sequence. The first sequence is to instruct the terminal device to wake up or sleep during an on duration in a DRX cycle after the first sequence. The terminal device belongs to a device group in M device groups. The first sequence corresponds to the device group to which the terminal device belongs and each device group in the M device groups corresponds to a respective first sequence.

The processor 810 is configured to wake up or sleep during the on duration in the DRX cycle after the first sequence according to the first sequence received by the transceiver 820.

Accordingly, the terminal device determines whether wakeup is required in the DRX cycle after the first sequence or not through the first sequence sent by the network device and, under the condition that wakeup is not required, a sleep state is kept, so that power consumption is reduced. Design of the first sequence is related to specific information of the terminal device, for example, information of the device group to which the terminal device belongs, a TA group to which the terminal device belongs and a PCI, so that terminal devices with different attributes may effectively identify respective first sequences and execute corresponding operations according to the first sequences.

Optionally, the device group to which the terminal device belongs is determined according to a UE-ID of the terminal device or an access level of the terminal device.

Optionally, M first sequences corresponding to the M device groups are: M orthogonal sequences, or M ZC sequences with different offset values.

Optionally, the first sequence corresponding to the terminal device is determined according to the device group to which the terminal device belongs and a TA where the terminal device is located.

Optionally, the terminal device belongs to a TA group in N TA groups, and M×N first sequences corresponding to M×N terminal devices belonging to different device groups and belonging to different TA groups in all terminal devices of the M device groups are: M×N orthogonal sequences, or M×N ZC sequences with different offset values.

Alternatively, M first sequences corresponding to the M device groups are M ZC sequences with different offset values, and the ZC sequences corresponding to the terminal devices belonging to different TA groups are scrambled with respective first scrambling codes, each of the first scrambling codes is generated based on a respective one of the TA groups.

Optionally, a serial number of the TA group to which the terminal device belongs is mod (TA code, N), and TA code is a TA code of the TA where the terminal device is located.

Optionally, the first sequence corresponding to the terminal device is determined according to information about the device group to which the terminal device belongs and a PCI of a cell where the terminal device is located.

Optionally, each of multiple cells corresponds to a respective one of multiple initial sequences, the respective initial sequence corresponding to each cell in the multiple cells is generated based on a PCI of the cell, each of the M device groups corresponds to a respective one of M second scrambling codes, and initial sequences corresponding to the terminal devices belonging to different device groups in each cell are scrambled with respective second scrambling codes.

Optionally, the transceiver 820 is specifically configured to receive the first sequence simultaneously sent by the network device and another network device in the TA through an SFN.

Optionally, the transceiver 820 is specifically configured to receive the first sequence sent by the network device by use of an ECP.

Optionally, the DRX indication signal further includes a second sequence, the second sequence is generated based on the PCI of the cell where the terminal device is located, and if the first sequence instructs the terminal device to wake up during the on duration in the DRX cycle after DRX information, the processor 810 is further configured to perform time-frequency synchronization according to the second sequence.

Optionally, the first sequence is ahead of the second sequence or behind of the second sequence in time domain.

Optionally, the PCI of the cell where the terminal device is located includes any one of: a PSS sequence or SSS sequence in an LTE system, an NB PSS sequence or NB SSS sequence in an NB-IoT system or an NR PSS sequence or NR SSS sequence in a 5G system.

It is to be understood that, in the embodiment of the disclosure, the processor 810 may be a CPU and the processor 810 may also be another universal processor, a DSP, an ASIC, an FPGA or another programmable logic device, discrete gate or transistor logic device, discrete hardware component or the like. The universal processor may be a microprocessor or the processor may also be any conventional processor and the like.

The memory 830 may include a ROM and a RAM and provides an instruction and data for the processor 810. A portion of the memory 830 may further include a nonvolatile RAM. In an implementation process, each step of the method may be completed by an integrated logic circuit in a hardware form in the processor 810 or an instruction in a software form. The steps of the method disclosed in combination with the embodiments of the disclosure may be directly embodied to be executed and completed by a hardware processor or executed and completed by a combination of software modules and the hardware in the processor 810. The software modules may be located in a mature storage medium in this field such as a RAM, a flash memory, a ROM, a programmable ROM, an electrically erasable programmable ROM, or a register. The storage medium is located in the memory 830. The processor 810 reads information in the memory 830 and completes the steps of the method in combination with the hardware therein. No more detailed descriptions will be made herein to avoid repetitions.

The terminal device 800 according to the embodiment of the disclosure may correspond to the terminal device configured to execute the method 400 in the method 400 and the terminal device 600 according to the embodiment of the disclosure, and each unit or module in the terminal device 800 is configured to execute the operation or processing process executed by the terminal device in the method 400. Herein, for avoiding elaborations, detailed descriptions thereof are omitted.

Figure 9:
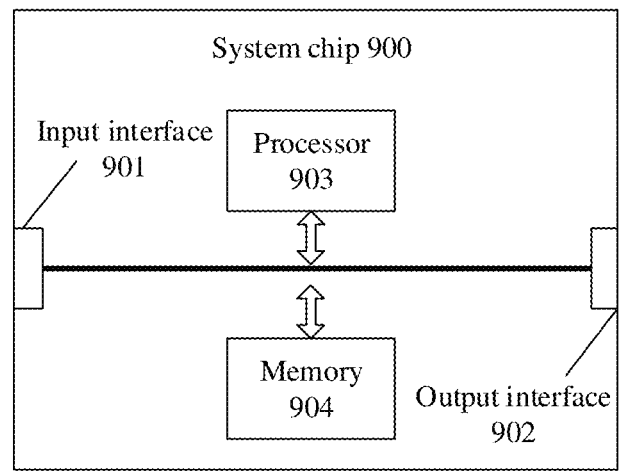
FIG. 9 is a schematic structure diagram showing a system chip according to an embodiment of the disclosure.

FIG. 9 is a schematic structure diagram showing a system chip according to an embodiment of the disclosure. The system chip 900 of FIG. 9 includes an input interface 901, an output interface 902, at least one processor 903 and a memory 904. The input interface 901, the output interface 902, the processor 903 and the memory 904 are connected with one another through an internal connecting path. The processor 903 is configured to execute a code in the memory 904.

Optionally, when the code is executed, the processor 903 may implement the method 300 executed by the network device in the method embodiment. For simplicity, no more elaborations will be made herein.

Optionally, when the code is executed, the processor 903 may implement the method 400 executed by the terminal device in the method embodiment. For simplicity, no more elaborations will be made herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Persons skilled in the art may implement the described functions by use of different methods for each specific application, and such implementation should not be regarded as going beyond the scope of the disclosure.

Those skilled in the art may clearly understand that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, the displayed or discussed mutual coupling, direct coupling or communication connection may be indirect coupling or communication connection through some interfaces, apparatuses or units, and may be electrical and mechanical or in other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, the functional units in each embodiment of the disclosure may be integrated into a monitoring unit, each unit may also physically exist separately, and two or more than two units may also be integrated into a unit.

When being implemented in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the disclosure. The storage medium includes various media capable of storing program codes such as a U disk, a mobile hard disk, a ROM, a RAM, a magnetic disk or an optical disk.

Disclosed above are merely several specific embodiments of the disclosure and not intended to limit the scope of protection of the embodiments of the disclosure. Any variations or replacements apparent to those skilled in the art within the technical scope disclosed by the embodiments of the disclosure shall fall within the scope of protection of the disclosure. Therefore, the scope of protection of the embodiments of the disclosure shall be subject to the scope of protection of the claims.

The invention claimed is:

1. A method for Discontinuous Reception (DRX), comprising:
receiving, by a terminal device, a DRX indication signal sent by a network device, wherein the DRX indication signal comprises a first sequence, the first sequence is to instruct the terminal device to wake up or sleep during an on duration in a DRX cycle after the first sequence, the terminal device belongs to a device group in M device groups, the first sequence corresponds to the device group to which the terminal device belongs, each device group in the M device groups corresponds to a respective first sequence and M is a positive integer; and
the terminal device waking up or sleeping during the on duration in the DRX cycle after the first sequence according to the first sequence, wherein
each of a plurality of cells corresponds to a respective one of a plurality of initial sequences, a respective initial sequence of the plurality of initial sequences corresponding to each of the plurality of cells is generated based on a Physical Cell Identifier (PCI) of the cell, each of the M device groups corresponds to a respective one of M second scrambling codes, and the initial sequences corresponding to terminal devices belonging to different device groups in each cell are scrambled with respective second scrambling codes, to generate first sequences corresponding to the terminal devices belonging to different device groups in each cell.

2. The method of claim 1, wherein the device group to which the terminal device belongs is determined according to a User Equipment Identity (UE-ID) of the terminal device or an access level of the terminal device.

3. The method of claim 1, wherein M first sequences corresponding to the M device groups are: M orthogonal sequences, or M Zadoff-Chu (ZC) sequences with different offset values.

4. A network device, comprising:
a processor;
a transceiver; and
a memory for storing instructions executable by the processor,
wherein the processor is configured to execute the instructions to:
determine a first sequence corresponding to a terminal device according to information about a device group to which the terminal device belongs, wherein the first sequence is to instruct the terminal device to wake up or sleep during an on duration in a Discontinuous Reception (DRX) cycle after the first sequence, the terminal device belongs to a device group in M device groups, the first sequence corresponds to the device group to which the terminal device belongs, each device group in the M device groups corresponds to a respective first sequence and M is a positive integer; and
control the transceiver to send a DRX indication signal to the terminal device, wherein the DRX indication signal comprises the first sequence determined by the processor, to enable the terminal device to wake up or sleep during the on duration in the DRX cycle after the first sequence according to the first sequence, wherein
each of a plurality of cells corresponds to a respective one of a plurality of initial sequences, a respective initial sequence of the plurality of initial sequences corresponding to each of the plurality of cells is generated based on a Physical Cell Identifier (PCI) of the cell, each of the M device groups corresponds to a respective one of M second scrambling codes, and the initial sequences corresponding to terminal devices belonging to different device groups in each cell are scrambled with respective second scrambling codes, to generate first sequences corresponding to the terminal devices belonging to different device groups in each cell.

5. The network device of claim 4, wherein the processor is further configured to:
determine the device group to which the terminal device belongs according to a User Equipment Identity (UE-ID) of the terminal device or an access level of the terminal device.

6. The network device of claim 4, wherein M first sequences corresponding to the M device groups are: M orthogonal sequences, or M Zadoff-Chu (ZC) sequences with different offset values.

7. A terminal device for Discontinuous Reception (DRX), comprising:
a processor;

a transceiver; and a memory for storing instructions executable by the processor, wherein the processor is configured to execute the instructions to:

control the transceiver to receive a DRX indication signal sent by a network device, wherein the DRX indication signal comprises a first sequence, the first sequence is to instruct the terminal device to wake up or sleep during an on duration in a DRX cycle after the first sequence, the terminal device belongs to a device group in M device groups, the first sequence corresponds to the device group to which the terminal device belongs, each device group in the M device groups corresponds to a respective first sequence and M is a positive integer; and wake up or sleep during the on duration in the DRX cycle after the first sequence according to the first sequence received by the transceiver, wherein each of a plurality of cells corresponds to a respective one of a plurality of initial sequences, a respective initial sequence of the plurality of initial sequences corresponding to each of the plurality of cells is generated based on a Physical Cell Identifier (PCI) of the cell, each of the M device groups corresponds to a respective one of M second scrambling codes, and the initial sequences corresponding to terminal devices belonging to different device groups in each cell are scrambled with respective second scrambling codes, to generate first sequences corresponding to the terminal devices belonging to different device groups in each cell.

8. The terminal device of claim 7, wherein the device group to which the terminal device belongs is determined according to a User Equipment Identity (UE-ID) of the terminal device or an access level of the terminal device.

9. The terminal device of claim 7, wherein M first sequences corresponding to the M device groups are: M orthogonal sequences, or M Zadoff-Chu (ZC) sequences with different offset values.

10. The terminal device of claim 7, wherein the first sequence corresponding to the terminal device is determined according to the device group to which the terminal device belongs and a Tracking Area (TA) where the terminal device is located.

11. The terminal device of claim 10, wherein the terminal device belongs to a TA group in N TA groups, and M×N first sequences corresponding to M×N terminal devices belonging to different device groups and belonging to different TA groups in all terminal devices of the M device groups are: M×N orthogonal sequences, or M×N Zadoff-Chu (ZC) sequences with different offset values; or M first sequences corresponding to the M device groups are M ZC sequences with different offset values, and the ZC sequences corresponding to the terminal devices belonging to different TA groups are scrambled with respective first scrambling codes, each of the first scrambling codes is generated based on a respective one of the TA groups and N is a positive integer.

12. The terminal device of claim 11, wherein a serial number of the TA group to which the terminal device belongs is mod (TA code, N), and TA code is a TA code of the TA where the terminal device is located.

13. The terminal device of claim 7, wherein the processor is specifically configured to control the transceiver to:

receive the first sequence simultaneously sent by the network device and other network devices in a Tracking Area (TA) where the terminal device is located through a Single Frequency Network (SFN).

14. The terminal device of claim 7, wherein the DRX indication signal further comprises a second sequence, the second sequence is generated based on a Physical Cell Identifier (PCI) of a cell where the terminal device is located, and in the case that the first sequence instructs the terminal device to wake up during the on duration in the DRX cycle after the first sequence, the processor is further configured to:

perform time-frequency synchronization according to the second sequence.

* * * * *